United States Patent
Chan et al.

(10) Patent No.: US 7,086,655 B2
(45) Date of Patent: Aug. 8, 2006

(54) CONNECTION BETWEEN VEHICLE AXLE AND SUSPENSION ARM

(75) Inventors: David Chan, Flintshire (GB); Martin Peaker, Chester (GB)

(73) Assignee: Meritor Heavy Vehicle Systems Limited, Wrexham (GB)

( * ) Notice: Subject to any disclaimer, the term of this patent is extended or adjusted under 35 U.S.C. 154(b) by 7 days.

(21) Appl. No.: 10/415,610

(22) PCT Filed: Aug. 31, 2001

(86) PCT No.: PCT/GB01/03894

§ 371 (c)(1),
(2), (4) Date: Sep. 26, 2003

(87) PCT Pub. No.: WO02/20289

PCT Pub. Date: Mar. 14, 2002

(65) Prior Publication Data

US 2004/0051268 A1 Mar. 18, 2004

(30) Foreign Application Priority Data

Sep. 5, 2000 (GB) ................................. 0021716.6

(51) Int. Cl.
*B60G 9/02* (2006.01)
(52) U.S. Cl. .................... 280/124.116; 280/124.132
(58) Field of Classification Search ......... 280/124.116, 280/124.128, 124.11, 124.13, 124.132; 301/125, 301/129
See application file for complete search history.

(56) References Cited

U.S. PATENT DOCUMENTS

| | | | |
|---|---|---|---|
| 1,325,832 A | 12/1919 | Cobum | |
| 2,011,239 A | 8/1935 | Christmas | |
| 2,163,981 A | 6/1939 | Lawrence | |
| 2,606,036 A | 8/1952 | Collender | |
| 2,635,896 A | 4/1953 | Tantlinger | |
| 2,877,010 A | 3/1959 | Gouirand | |
| 2,913,252 A | 11/1959 | Norrie | |
| 2,993,707 A | 7/1961 | Vaugoyeau | |
| 3,015,238 A * | 1/1962 | Williams | ................. 74/607 |

(Continued)

FOREIGN PATENT DOCUMENTS

DE 1933469 7/1969

(Continued)

OTHER PUBLICATIONS

Daytonair Truckmaster Suspension Brochure (Prior Art), date unknown.

(Continued)

*Primary Examiner*—David R. Dunn
(74) *Attorney, Agent, or Firm*—Carlson, Gaskey & Olds

(57) ABSTRACT

A vehicle suspension axle wrap is a composite tubular structure of cast or forged shells of part-tubular shape. The shells are assembled into a tubular form and welded together at juxtaposed edges. The shells can be cast or forged accurately to shape and profile to provide an improved quality axle wrap. Wall thickness variations can be designed into the shells. The juxtaposed edges are shaped to space the welding at the edges from the interior of the assembled axle wrap. The edges are beveled adjacent the external circumferential surfaces of the shells to provide a V-shaped groove at which the welding is made. There is a stepped engagement at the edges between the V-shaped groove and the internal surface of the axle wrap to prevent the welding from extending to the internal surface. Each shell is formed with an aperture at which a welded joint can be made between the axle wrap and an axle.

19 Claims, 3 Drawing Sheets

U.S. PATENT DOCUMENTS

| | | |
|---|---|---|
| 3,140,880 A | 7/1964 | Masser |
| 3,434,707 A | 3/1969 | Raidel |
| 3,547,215 A | 12/1970 | Bird |
| 3,594,017 A | 7/1971 | Grosseau |
| 3,630,541 A | 12/1971 | Carlson |
| 3,707,298 A | 12/1972 | Henry |
| 3,771,812 A | 11/1973 | Pierce |
| 3,785,673 A | 1/1974 | Harbers |
| 3,961,826 A | 6/1976 | Sweet |
| 4,027,898 A | 6/1977 | Steen |
| 4,061,362 A | 12/1977 | Bufler |
| 4,065,153 A | 12/1977 | Pringle |
| 4,166,640 A | 9/1979 | VanDenberg |
| 4,174,855 A | 11/1979 | Vandenberg |
| 4,293,145 A | 10/1981 | Taylor |
| 4,310,171 A | 1/1982 | Merkle |
| 4,352,509 A | 10/1982 | Paton |
| 4,371,190 A | 2/1983 | Vandenberg |
| 4,415,179 A | 11/1983 | Marinelli |
| 4,427,213 A | 1/1984 | Raidel |
| 4,494,771 A | 1/1985 | Raidel |
| 4,504,080 A | 3/1985 | Vandenberg |
| 4,529,224 A | 7/1985 | Raidel |
| 4,537,420 A | 8/1985 | Ito |
| 4,541,643 A | 9/1985 | Pavincic |
| 4,566,719 A | 1/1986 | Vandenberg |
| 4,691,937 A | 9/1987 | Raidel |
| 4,693,486 A | 9/1987 | Pierce |
| 4,722,549 A | 2/1988 | Raidel |
| 4,763,923 A | 8/1988 | Raidel |
| 4,878,691 A | 11/1989 | Cooper |
| 4,902,035 A | 2/1990 | Raidel |
| 4,921,159 A * | 5/1990 | Peck .......................... 228/182 |
| 4,943,081 A | 7/1990 | Golpe |
| 4,991,868 A | 2/1991 | Vandenberg |
| 5,002,305 A | 3/1991 | Raidel |
| 5,029,885 A | 7/1991 | Steiner |
| 5,037,126 A | 8/1991 | Gottschalk |
| 5,058,916 A | 10/1991 | Hicks |
| 5,112,078 A | 5/1992 | Galazin |
| 5,127,668 A | 7/1992 | Raidel |
| 5,171,036 A | 12/1992 | Ross |
| 5,203,585 A | 4/1993 | Pierce |
| 5,366,237 A | 11/1994 | Dilling |
| 5,375,871 A | 12/1994 | Mitchell et al. |
| 5,403,031 A | 4/1995 | Gottschalk |
| 5,443,280 A | 8/1995 | Kawaguchi |
| 5,464,245 A | 11/1995 | Vogler |
| 5,639,110 A | 6/1997 | Pierce et al. |
| 5,690,353 A | 11/1997 | Vandenberg |
| 5,720,489 A | 2/1998 | Peirce |
| 5,785,345 A | 7/1998 | Barlas |
| 5,810,377 A | 9/1998 | Keeler |
| 5,887,881 A | 3/1999 | Hatch |
| 5,921,570 A | 7/1999 | Lie |
| 5,938,221 A | 8/1999 | Wilson |
| 5,944,339 A | 8/1999 | McKenzie |
| 5,950,971 A | 9/1999 | Koumbis |
| 5,954,351 A | 9/1999 | Koschinat |
| 5,988,672 A | 11/1999 | VanDenberg |
| 5,996,981 A | 12/1999 | Dilling |
| 6,039,336 A | 3/2000 | Frey |
| 6,062,578 A | 5/2000 | Richardson |
| 6,073,946 A | 6/2000 | Richardson |
| 6,123,349 A | 9/2000 | Depue |
| 6,209,895 B1 | 4/2001 | Mueller et al. |
| 6,241,266 B1 * | 6/2001 | Smith et al. .......... 280/124.116 |
| 6,264,231 B1 | 7/2001 | Scully |
| 6,425,593 B1 | 7/2002 | Fabris |
| 6,508,482 B1 | 1/2003 | Pierce |
| 2003/0146592 A1 | 8/2003 | Chalin et al. |
| 2004/0051268 A1 | 3/2004 | Chan et al. |

FOREIGN PATENT DOCUMENTS

| | | |
|---|---|---|
| DE | 3119022 A1 | 12/1982 |
| EP | 0458665 A1 | 11/1991 |
| EP | 0600198 B1 | 6/1994 |
| WO | WO 98/17487 | 4/1998 |
| WO | WO 00/01548 | 1/2000 |

OTHER PUBLICATIONS

Eaton Axle and Brake Brochure and Information—1989.

Fruehauf Cargo Care and Pro Par Suspension Brochure (Prior Art), date unknown.

GMC Astro-Air Suspension Brochure and Information (Prior Art), date unknown.

HT Series Suspension Brochure (Prior Art), date unknown.

Hutchens & Sons Suspensions Brochure (Prior Art), date unknown.

Rockwell International ROR Bogie Assemblies Brochure, date unknown.

* cited by examiner

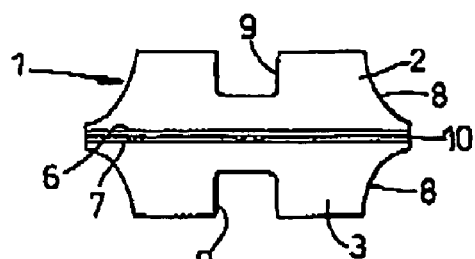
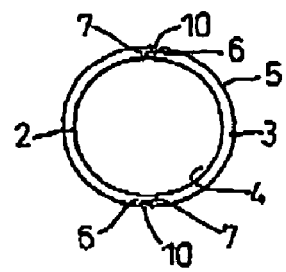
Fig. 1  Fig. 2
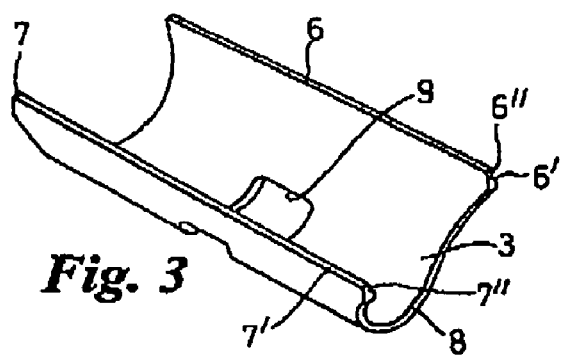
Fig. 3
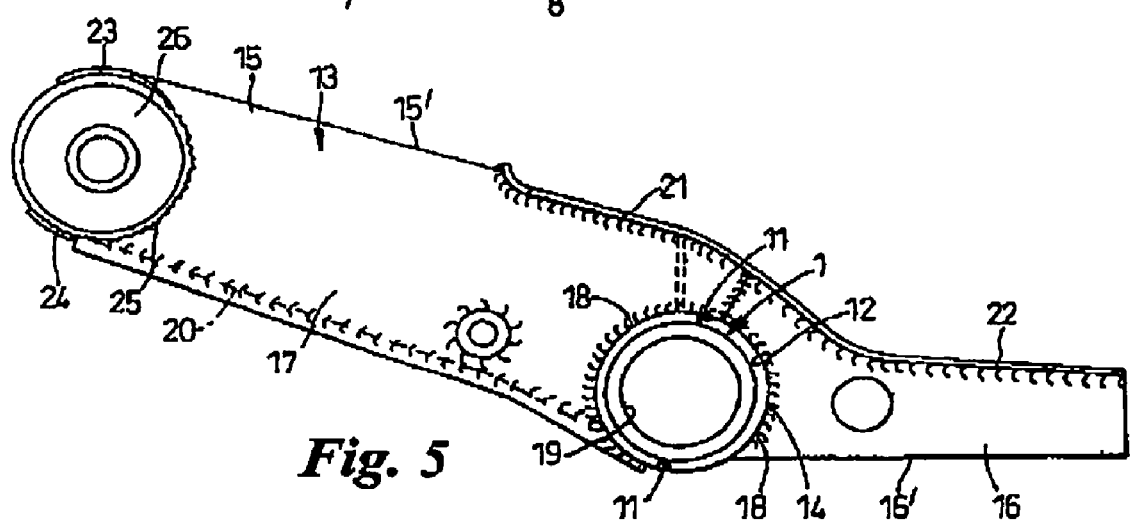
Fig. 5

CONNECTION BETWEEN VEHICLE AXLE AND SUSPENSION ARM

This application is the National Stage of International Application PCT/GB01/03894 filed on Aug. 31, 2001.

BACKGROUND OF THE INVENTION

This invention relates to a vehicle suspension axle wrap.

Axle wraps are used in the securing of axles to beams, for example in trailing arm suspensions. The axle wraps are welded to the beams.

Conventionally axle wraps have been made from metal plate which is formed to sleeve shape to receive the axles therein. A problem with forming an axle wrap from metal plate is that accuracy of its finished shape cannot be ensured. There may be variations in the wall thickness of the formed axle wrap and in profile shaping of the wrap which impair the effectiveness of securing the axle wrap to a beam and to the axle which it retains to the beam.

SUMMARY OF THE INVENTION

The vehicle suspension axle wrap of the present invention is a composite tubular structure of cast or forged shells that are part-tubular in shape. The shells are assembled into the tubular structure and welded together at juxtaposed edges.

The shells can be cast or forged very accurately to shape and profile to provide a better quality axle wrap than the known axle wraps formed from metal plate. A bead or rib formation can be included to vary the wall thickness of the shells.

Preferably, the juxtaposed edges of the shells are shaped to space the welding at the edges from the internal circumferential surface of the assembled axle wrap. The welding, therefore, does not intrude into the interior of the axle wrap. Therefore, a subsequent finishing treatment is not needed to remove the welding from the interior which might interfere with correct seating of the axle in the axle wrap. The edges of the shells are beveled adjacent to the external circumferential surfaces of the shells, defining a V-shaped groove between the juxtaposed edges at which the welding is made. A mating stepped engagement between the V-shaped groove and the internal circumferential surface of the axle wrap acts as a barrier to prevent the welding from extending to the internal circumferential surface. For example, inwardly of the V-shaped groove, one edge has a projecting lip or flange and the other edge has a complementally shaped recess which the lip or flange engages. As an alternative, the juxtaposed edges are shaped so that inwardly of the V-shaped groove the edges meet at an angle inclined to the internal circumferential surface of the axle wrap. In this example, one edge has a single chamfer with an inner part and an outer part and the other edge has a double chamfer, including an outer chamfer and an inner chamfer. The outer chamfer and the outer part of the single chamfer define the V-shaped groove, and the inner; chamfer meets, and extends parallel to, the inner part of the single chamfer. These barrier arrangements effectively form an integral backing strip at the juxtaposed edges and so avoid the need for a separate backing strip to be applied inside the axle wrap at the edges while the shells are being welded or bonded together.

The shells can join on a central axial plane of the axle wrap. Alternately, the shells can join on a plane inclined to the central axial plane, so that at one end of the axle wrap, a shell extends through more than 180° and at the opposite end the shell extends through less than 180°. This latter arrangement enables some relative axial, and thereby diametral, adjustment between the shells to position them before they are secured together.

The interior of the axle wrap is cylindrical, but the exterior of the axle wrap can have a cylindrical or non-cylindrical form with uniform or varied wall thicknesses, as desired. A bead or rib formation can be employed to vary the wall thickness.

An aperture is formed in at least one of the shells to allow welding between the axle wrap and the axle at the periphery of the aperture. The aperture can be circular or non-circular.

The exterior circumference surface of the axle wrap is secured by welding to a complementary seating in a suspension beam. It may be welded, preferably continuously, around its external circumference to the beam. In a beam of hollow box or comparable section having opposed side walls, the seating for the axle wrap is defined by recesses in the side walls of the beam. Preferably, in accordance with our co-pending GB patent application No. 0021718.2, the axle wrap is secured to the beam by welded jointing internally and externally of the beam.

According to a second aspect of the present invention a suspension beam is provided which includes an axle wrap in accordance with the first aspect of the present invention herein set forth.

BRIEF DESCRIPTION OF THE DRAWINGS

An embodiment of the invention will now be described by way of example only with the reference to the accompanying drawings, in which:

FIG. 1 is a plan view of a vehicle suspension axle wrap in accordance with the present invention;

FIG. 2 is an end view of the axle wrap;

FIG. 3 is a perspective view of a shell of the axle wrap,

FIG. 5 is a side view of a suspension beam including the axle wrap.

DETAILED DESCRIPTION OF THE PREFERRED EMBODIMENT

As shown in FIG. 1, the cylindrical axle wrap 1 of the present invention includes two similar semi-circular shells 2 and 3 which are assembled and welded together to form the tubular axle wrap 1.

Figure 4:
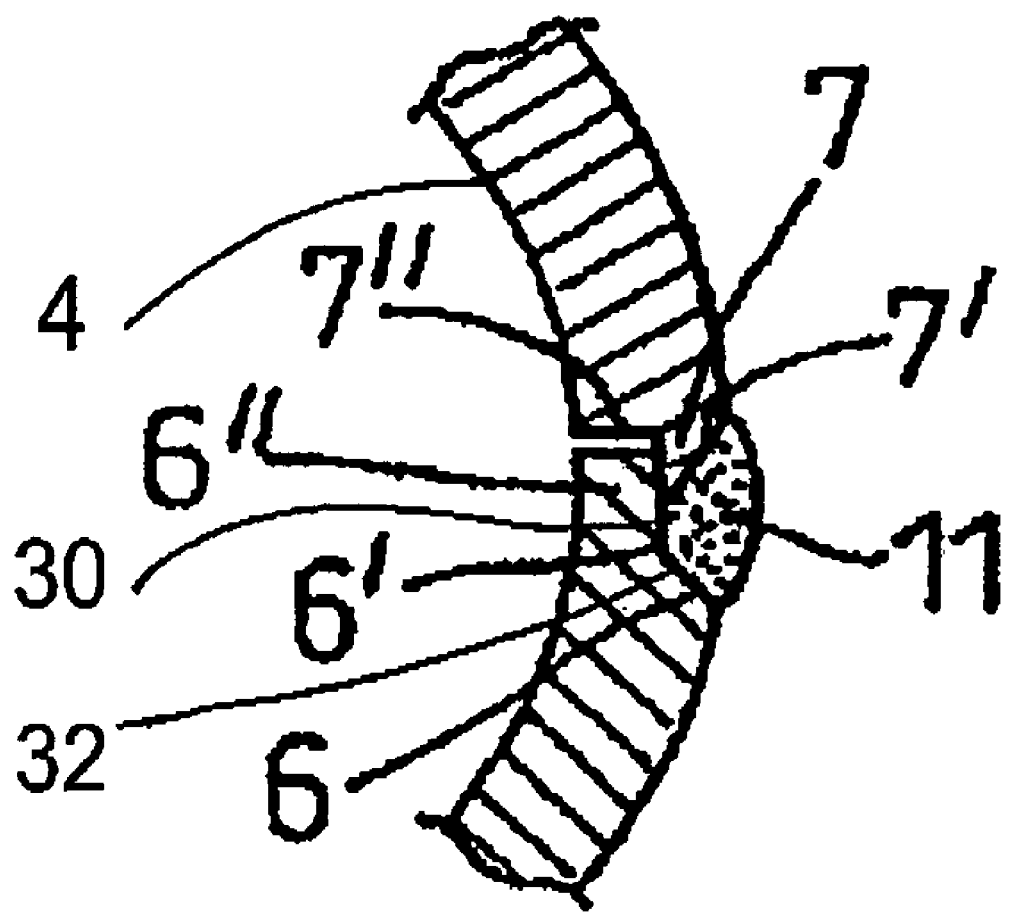
FIG. 4 is an enlarged fragmentary section through juxtaposed edges of shells of the axle wrap.

As further shown in FIG. 2, each shell 2 and 3 is accurately formed to shape as a steel casting or forging and has a smooth, semi-cylindrical internal surface 4 and an external surface 5. As best seen in FIGS. 3 and 4, each shell 2 and 3 has one longitudinal edge 6 formed with a chamfer 6' (a single chamfer) and a projecting lip 6" of rectangular cross-section. The chamfer 6' has a first surface 30 and a second surface 32. Each shell 2 and 3 also includes and an opposing longitudinal edge 7 formed with a chamfer 7' (an outer chamfer) and a recess 7" (an inner chamfer) of complementary rectangular shape to the lip 6". End edges 8 of each shell 2 and 3 are square, but are concavely arced circumferentially of the shell 2 and; 3 so that the longitudinal edges 6 and 7 of the shell 2 and 3 are longer than the length of the shell 2 and 3 at the crest of its semi-cylindrical shape. An elongated, generally rectangular, aperture 9 is formed in the center of each shell 2 and 3 and through the wall of each shell 2 and 3. The aperture 9 has rounded corners and a length that extends circumferentially of the shell 2 and 3.

The two shells 2 and 3 are assembled together so that each shell has the chamfer 6' and lip 6" of the longitudinal edge 6 juxtaposed with the chamfer 7' and recess 7" of the opposing longitudinal edge 7 of the other shell. Where each pair of juxtaposed longitudinal edges 6 and 7 meet, a V-shaped, external groove 10 is defined between the chamfers 6' and 7'. The lip 6" of the one edge 6 locates closely in the recess 7" of the other edge 7. A step is therefore formed by the mating edges 6 and 7 between the groove 10 and the internal circumferential surface of the formed axle wrap 1. The two diametrically opposed, external grooves 10 extend along the length of the formed fully tubular axle wrap 1. As shown in FIG. 4, the shells 2 and 3 are welded together, at the grooves 10 continuously along the lengths of the juxtaposed longitudinal edges 6 by a weld. The welds 11, therefore, are contained at the exterior of the finished axle wrap 1. The stepped engagement of the juxtaposed edges 6 and 7 inwardly of the groove 10 provides a barrier to prevent the welds 11 from extending into the interior of the axle wrap 1, leaving the internal circumferential surface of the axle wrap 1 smooth and unimpaired throughout its circumference.

Figure 6:
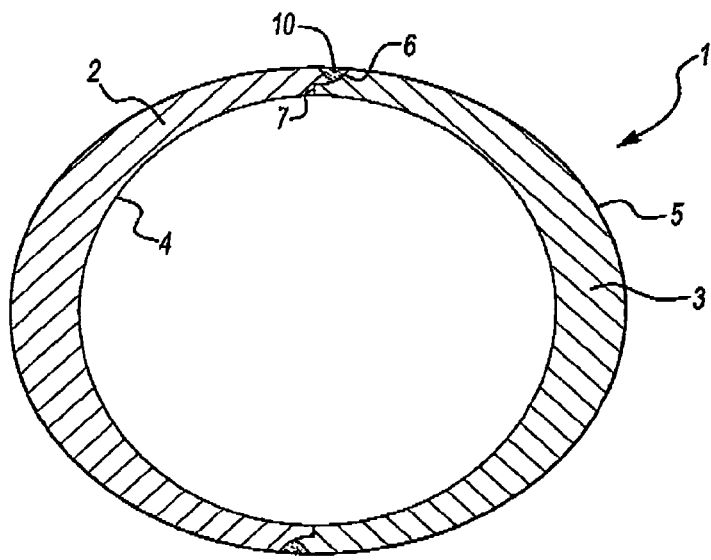
FIG. 6 schematically illustrates an end view of an alternate axle wrap with a non-cylindrical form.
Figure 8:
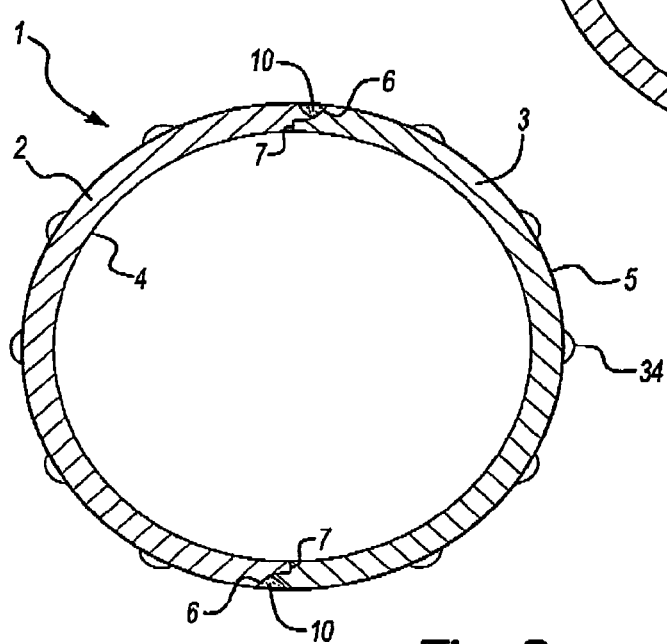
FIG. 8 schematically illustrates an end view of an alternate axle wrap wit bead formations or rib formations.

The axle wrap 1 can be made to any desired length and diameter to suit the axle and suspension beam with which it is to be used. The shapes and profiles of the shells 2 and 3 can be readily changed in the casting and forging process to suit the requirements of the axle wrap 1 to be produced. The wall thickness of the shells 2 and 3 can be varied by employing a bead formation 34 or a rib formation 34, as shown in FIG. 8. The interior of the axle wrap 1 is cylindrical, but the shells 2 and 3 may be shaped to give the exterior of the axle wrap 1 a cylindrical (shown in FIG. 2) or non-cylindrical form (shown in FIG. 6).

Figure 7:
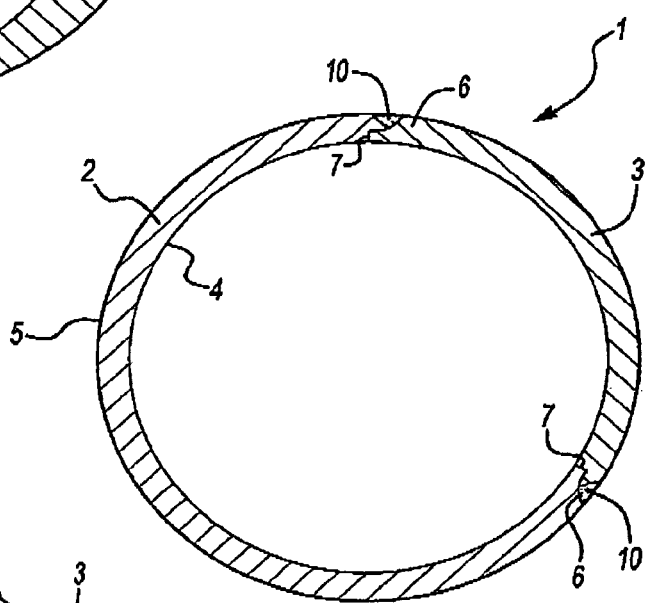
FIG. 7 schematically illustrates an end view of an alternate axle wrap with shells that meet on a plane inclined relative to a central axial plane.

The shells 2 and 3 can join on a central plane of the axle wrap 1, as shown in FIG. 2. Alternately, the shells 2 and 3 can join on a plane inclined relative to the central plane of the axle wrap 1, as shown in FIG. 7. In this example, on one end of the axle wrap 1, a shell extends through more than 180°, and the opposing end of the shell extends through less than 180°. This latter arrangement enables some relative axial, and thereby diametral adjustment between the shells 2 and 3 to position them before they are secured together.

In a suspension beam assembly, as shown for example in FIG. 5, the axle wrap 1 is located in a complementary seating 12 in a beam 13 and is fixed by continuous welding 14 of its external circumferential surface to the periphery of the seating 12. The beam 13, in the example shown, is of a hollow construction including forward and rearward components 15 and 16 of a generally U-shaped section buttwelded together end-to-end. Each component 15 and 16 is made from metal plate cut to the required outline and formed to the generally U-shaped section. The components 15 and 16 are welded together such that their opposite side limbs form side walls 17 of the beam 13. The web 15' of the forward component 15 is at the top of the beam 13, whilst the web 16' of the rearward component 16 is at the bottom of the beam 13. The seating 12 for the axle wrap 1 is defined by co-axial, almost circular, recesses 18 formed in the side walls 17 by part-circular hollows in the butting end edges of the forward and rearward components 15 and 16. The axle wrap 1 is welded to the side walls 17 of the beam 13 around the recesses 18, on both the outside and inside of the side walls 17, in accordance with our co-pending GB patent application No. 0021718.2. The inside welding is made possible by the access available through the mouths of the U-shaped sections of the forward and rearward components 15 and 16.

An axle 19 is fixed in the axle wrap 1 by welding the axle wrap 1 to the axle 19 around the peripheries of the apertures 9. A galling agent, in the form of a paste, may be applied between the axle wrap 1 and the axle 19 to increase frictional purchase between them and thereby assist in evening out load distribution between the two parts.

A forward cover plate 20 is welded in the mouth of the forward component 15 to close the bottom of the beam 13 between its front end and the axle wrap 1. In addition, a rearward cover plate 21 is welded over the mouth of the beam 13 between its rear end and the web 15' of the forward component 15. The rearward cover plate 21 also provides a seating 22 for an air spring, not shown.

Front ends 23, 24 of the web 15' of the forward component 15 and of the forward cover plate 20, and front edges of the side limbs of the component, are so shaped as to form in combination a seating 25 for a pivot bush 26 of the beam 13.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle suspension axle wrap comprising:
 a composite tubular structure including at least two shells of part-tubular shape, each of said at least two shells having an internal circumferential surface, an external circumferential surface, and juxtaposed edges, and said at least two shells being assembled into said composite tubular structure with said juxtaposed edges being secured by a weld bead, wherein a portion of each of said juxtaposed edges overlap and said internal circumferential surface is substantially cylindrical.

2. The vehicle suspension axle wrap according to claim 1 wherein said at least two shells have a variable wall thickness.

3. The vehicle suspension axle wrap according to claim 2 wherein said at least two shells include one of a bead formation and a rib formation to provide said variable wall thickness.

4. The vehicle suspension axle wrap according to claim 1 wherein said juxtaposed edges prevent said weld bead from contacting said internal circumferential surface.

5. The vehicle suspension axle wrap according to claim 1 wherein said juxtaposed edges are beveled adjacent said external circumferential surface, and a V-shaped groove is defined between said juxtaposed edges, said weld bead securing said at least two shells together at said V-shaped groove.

6. The vehicle suspension axle wrap according to claim 5 wherein said juxtaposed edges are shaped between said V-shaped groove and said internal circumferential surface to define a mating stepped engagement that prevents said weld bead from extending to said internal circumferential surface.

7. The vehicle suspension axle wrap according to claim 5 wherein inwardly of said V-shaped groove one of said juxtaposed edges has a projecting lip and the other of said juxtaposed edges has a complementary shaped recess which said projecting lip engages.

8. The vehicle suspension axle wrap according to claim 5 wherein said juxtaposed edges meet inwardly of said V-shaped groove at an angle inclined relative to said internal circumferential surface.

9. The vehicle suspension axle wrap according to claim 5 wherein one of said juxtaposed edges has a single chamfer with a first surface and second surface, and the other of said juxtaposed edges has an outer chamfer and an inner chamfer, said outer chamfer and said first surface defining said V-shaped groove, and said inner chamfer meeting and extending parallel to said second surface.

10. The vehicle suspension axle wrap according to claim 1 wherein said at least two shells comprise only two shells.

11. The vehicle suspension axle wrap according to claim 10 wherein said only two shells have a common shape.

12. The vehicle suspension axle wrap according to claim 10 wherein said only two shells meet on a central axial plane of said composite tubular structure.

13. The vehicle suspension axle wrap according to claim 10 wherein said only two shells meet on a plane inclined relative to a central axial plane of said composite tubular structure.

14. The vehicle suspension axle wrap according to claim 1 wherein said external circumferential surface is substantially cylindrical.

15. The vehicle suspension axle wrap according to claim 1 wherein said external circumferential surface is substantially non-cylindrical.

16. The vehicle suspension axle wrap according to claim 1 wherein at least one of said at least two shells has an aperture opening from said external circumferential surface to said internal circumferential surface, and a welded joint is made at a periphery of said aperture between the vehicle suspension axle wrap and the axle received in the vehicle suspension said axle wrap.

17. A suspension beam comprising:

a composite tubular structure of at least two shells of part-tubular shape, said at least two shells having an internal circumferential surface, an external circumferential surface, and juxtaposed edges, and said at least two shells being assembled into said composite tubular structure with said juxtaposed edges being secured by a weld bead, and said composite tubular structure being secured to the suspension beam, wherein a portion of each of said juxtaposed edges overlap and said internal circumferential surface is substantially cylindrical.

18. The vehicle suspension axle wrap as recited in claim 16 wherein said aperture is substantially rectangular.

19. The vehicle suspension axle wrap as recited in claim 1 wherein said weld bead extends continuously along said juxtaposed edges.

* * * * *